United States Patent Office 2,894,908
Patented July 14, 1959

2,894,908

ACIDIZING WELLS

Jack Newcombe and Wayne S. Fallgatter, Tulsa, Okla., assignors to Cities Service Research and Development Company, New York, N.Y., a corporation of New Jersey No Drawing. Application February 6, 1957
Serial No. 638,452

19 Claims. (Cl. 252—8.55)

This invention relates to a new and improved method and composition for acidizing oil bearing formations. More particularly, this invention relates to a new and improved acidizing composition uniquely adapted for treating calcareous formations containing water sensitive minerals.

The continuous depletion of oil sand properties has caused increased interest to be focused on the recovery of oil from formations previously bypassed due to the extreme difficulties faced in recovering oil therefrom. One particular type of formation falling within the foregoing category is that generally referred to as a limestone or calcareous formation containing hydratable silicates.

Such formations are rather extensive and are known to contain considerable quantities of oil. Very little success has been attained, however, in recovery oil from such formations by conventional treating methods. This is due primarily to the presence of highly hydratable silicates which often comprise as much as 10% of the total formation. Experience has shown that treatment of such formations according to conventional acidizing techniques often results in a reduction in permeability rather than in permeability increase such as would be expected when treating a normal limestone formation according to standard techniques. This is due to the fact that the water sensitive minerals, particularly the hydratable silicate, mingled with the carbonate in the formation swell considerably in volume when contacted with acid or other treating solutions. This increase in the volume of the silicates causes a reduction in permeability and consequently a reduction in oil recovery.

This condition could be overcome if means were available to control or preferably prevent silicate swelling during acid treatment. Several attempts have been made with varying degrees of success but no acidizing composition or acidizing process presently available is sufficiently effective in view of the costs to warrant widespread commercial adoption.

It is accordingly an object of the present invention to provide a new and improved method and composition for the treatment of calcareous formations containing hydratable silicates.

It is another object of the present invention to provide a new method of acidizing limestone formations which contain hydratable silicates in a manner that reduces and prevents silicate swelling during acidizing.

It is another object of the present invention to increase the recovery of oil from calcareous formations and simultaneously protect the equipment utilized in the acidizing process.

It is a still further object of this invention to provide an improved acidizing process which can be used in conjunction with secondary recovery methods such as in water flooding for increasing oil production from formations containing swellable silicates.

It has been suggested in U.S. 2,713,033 that the addition of tetraalkylammonium chloride to an acidizing solution will minimize swelling of silicates. Similarly U.S. 2,640,810 teaches that control of pH during acidizing of chalk will minimize the swelling of hydratable clays.

While the foregoing methods provide some control of silicate swelling, it has now been found that silicate swelling can be minimized and controlled far more effectively by means of the new and improved method and acid composition of the present invention.

It has been found that acidizing calcareous formations containing hydratable silicates according to the method of the present invention will provide permeability increases of 100 fold or more. In addition to providing control of silicate swelling during acidizing, the improved composition of this invention simultaneously provides substantial protection against the corrosive action of the acidizing solution on well tubing and associated equipment. In addition, the new acidizing solutions lower the interfacial tension of the oil and water present in the formation so that improved back-flow of the acid solution from the formation to the well is obtained.

The foregoing objects and advantages are accomplished according to the present invention by including in a hydrochloric acidizing solution a small amount of an acid soluble imidazoline-imidazolidine having a molecular weight of from about 160 to 680. These imidazoline-imidazolidine compounds unexpectedly provide a unique control of the swelling of silicates during acidizing.

The imidazoline-imidazolidine is generally present in an amount of from 0.01 to about 2.0% by weight based on the total acid solution. Generally effective amounts of the imidazoline-imidazolidine are from about 0.1% to 1.0%, a preferred amount being from about 0.4% to about 0.6%.

The aqueous solution of HCl will normally include from about 25% HCl. In conventional acidizing methods a 15% HCl solution is used. For purposes of the present invention, such a concentration of HCl is quite satisfactory. While hydrochloric acid is the preferred acid, other mineral acids, such as nitric, hydrofluoric, hydrobromic, sulfuric, or sulfamic acids, may be used if desired.

While the presence of the imidazoline-imidazolidine in the HCl solution adds greatly to the effectiveness of the HCl solution when treating formations containing hydratable silicates, an even greater improvement in acidizing with aqueous HCl can be obtained if there is combined with the HCl an aliphatic monocarboxylic acid having from 1 to 5 atoms. It has been found that adding to the solution of HCl and imidazoline-imidazolidine such an organic acid in an amount of from about 0.5 to 25% provides even greater permeability increases when treating formations containing hydratable silicates. Generally effective amounts of the organic acid will be from about 5 to 20%. The improved result obtained by the presence of the organic acid is not easily explained, though it appears that the organic acid in some way enhances the effectiveness of the HCl without interfering or adversely affecting the anti-swelling characteristics of the solution provided by the imidazoline-imidazolidine.

Suitable organic acids for this purpose are formic, acetic, propionic, butyric, and valeric acids. Other organic acids, such as the low molecular weight dicarboxylic acids could be used, but the limited solubility of the calcium salts of the formations in such acids limits their application to the present invention. The use of higher molecular weight organic acids is limited somewhat by cost but more particularly by their limited solubility in hydrochloric acid. Accordingly, low molecular weights acids having 5 carbon atoms or less are preferred.

The anti-swelling agents utilized are the acid soluble imidazoline-imidazolidines having a molecular weight from about 160 to 680. These particular compounds when added to the acid solution provide unexpected but substantial reduction in silicate swelling. The effectiveness of these imidazoline-imidazolidine compounds in providing the desired control of silicate swelling will be clearly demonstrated hereafter. The imidazoline-imidazolidine compound is added to the HCl acid or the HCl and organic acid mixture in amount of from about 0.01% to about 2% by weight of the total acid mixture. It has been found that increasing the amount of the imidazoline-imidazolidine about 2% does not materially increase the efficiency of the acidizing solution in controlling silicate swelling. This effect may be attributed to an inhibiting of the action of the acid on the carbonate in the formation.

The imidazoline-imidazolidine anti-swelling agent is generally represented by the following formula:

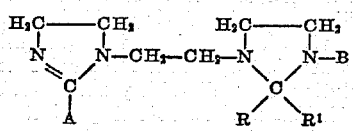

In the foregoing formula, A may be hydrogen, alkyl, cycloalkyl, alkenyl, aryl, or an alkylaryl group having from 1 to 18 carbon atoms. The groups mentioned under A above may include such substituents as hydroxyl or halogen, though such substituents are not generally preferred; B represents H or —$CH_2$—$CH_2$—$NH_2$; and R and $R^1$ represent the residue of an aldehyde or ketone group having a configuration similar to the group configuration defined for A above. It is, of course, understood that A, R, and $R^1$ may be similar or dissimilar groups depending on the acid, aldehyde, or ketone used in preparing the imidazoline-imidazolidine compound.

These unique imidazoline-imidazolidine anti-swelling agents corresponding to the foregoing formula are generally prepared by first reacting equimolar amounts of a polyamine with a monocarboxylic acid to form the imidazoline ring of the final imidazoline-imidazolidine compound. If desired, the imidazoline ring portion of the imidazoline-imidazolidine may be prepared first, by reacting the polyamine with a selected aldehyde or ketone.

In preparing the imidazoline ring portion of the final imidazoline-imidazolidine, the selected polyamine and monocarboxylic acid in equimolar amounts are reacted under conditions which effect a condensation reaction. To accomplish this, the reaction mixture is heated to a temperature of from about 105° C. to about 200° C. for a period from 1 to about 6 hours. The time will, of course, depend on the temperature at which the reaction mixture is refluxed. The water of condensation, which will amount to 2 mols when 1 mol of acid is reacted with 1 mol of amine, is distilled directly from the reaction mixture or is removed by means of an azeotrope-forming solvent, such as benzene, toluene, xylene, or the like. If such a solvent is used, reflux is carried out at a temperature near the boiling point of the particular azeotrope-forming solvent used.

After the imidazoline ring is formed, an equimolar amount of a selected aldehyde or ketone is added to the reaction zone. The mixture is then heated under conditions similar to those described above for a period of time sufficient to obtain formation of the imidazolidine ring on the ethylamino sidechain of the imidazoline ring. If desired, as in preparing the imidazoline ring, an azeotrope solvent may be used in forming the imidazolidine ring. After water of condensation, which will be 1 mol for each mol of aldehyde used, has been removed and the azeotrope distilled, the final imidazoline-imidazolidine compound will be obtained.

It has been found that the imidazoline-imidazolidine compounds used in this invention can be improved under certain conditions by adding thereto limited amounts of an olefin oxide. The addition of from 0.5 to 5 mols of an olefin oxide, preferably ethylene oxide, to the final imidazoline-imidazolidine compound will generally improve the solubility of the imidazoline-imidazolidine in acid solution and increase its effectiveness as an anti-swelling agent.

Under certain circumstances, however, the addition of ethylene oxide may not be desirable if the addition decreases the effectiveness of the imidazoline-imidazolidine compound in controlling silicate swelling. When the imidazoline-imidazolidine is prepared from higher molecular weight amines and low molecular weight acids and aldehydes, ethylene oxide addition is not generally preferred. If low molecular weight polyamines are reacted with high molecular weight acids and aldehydes, the addition of ethylene oxide is desirable to increase the solubility of the imidazoline-imidazolidine in the acid solution. The position at which the ethylene oxide adds to the imidazoline-imidazolidine has not been fully determined; however, it will be quite apparent that its presence generally adds to the effectiveness of the imidazoline-imidazolidine in controlling clay swelling. This will be evident from Table I and the description which follows.

In preparing the imidazoline-imidazolidine anti-swelling compound utilized in the improved acidizing solution of the present invention, the preferred polyethyleneamines are triethylene tetramine and tetraethylene pentamine. Higher molecular weight polyamines may be used if available, but the use of such compounds when reacted with high molecular weight acids and aldehydes would produce final imidazoline-imidazolidine compounds having molecular weights outside of the effective molecular weight range.

The monocarboxylic acid used in preparing the imidazoline-imidazolidines will be an acid having from 1 to 18 carbon atoms. The acid may be of saturated or unsaturated character and may be of straight, branched, or ring configuration. Substituted acids may be used. Among the monocarboxylic acids which may be satisfactorily used are: formic, acetic, acrylic, propionic, butyric, caproic, pelargonic, capric, undecoic, lauric, myristic, palmitic, oleic, stearic, and benzoic acids.

The aldehyde or ketone utilized in preparing the imidazolidine ring portion of the final imidazoline-imidazolidine compound will generally include those aldehydes having from 1 to about 18 carbon atoms.

Generally speaking, aldehydes or ketones having from 2 to 10 carbon atoms are preferred. Among the aldehydes and ketones which can be used are the following: formaldehyde, acetaldehyde, propionaldehyde, butyraldehyde, valeraldehyde, heptaldehyde, caprylicaldehyde, benzaldehyde, crotonaldehyde, salicylaldehyde, anisaldehyde, chlorobenzaldehyde, aldol, dodecanol, octadecanal, furfural, acetone, methyl ethyl ketone, hexanone, diamyl ketone, stearone, benzophenone, chloracetone, acetylacetone, mesityl oxide, phorone, cyclohexanone, and hydroxyacetophenone.

To better understand the nature of the imidazoline-imidazolidine anti-swelling agents and the manner of preparing the same, the following example is provided:

To about 18.9 grams (0.1 mol) of tetraethylene pentamine, 28 grams (0.1 mol) of oleic acid is added with mixing. Approximately 50 ml. of xylene is added to the mixture. The mixture is then refluxed at a temperature of about 145° C. for about 4 hours. During the reflux period, water is continuously removed in a decanter type still until approximately 3.6 grams or 0.2 mol of water has been collected. Recovery of this amount of water indicates the formation of the imidazoline ring.

After the intermediate imidazoline compound has been obtained, 11.4 grams (0.1 mol) of heptaldehyde is added to the reaction mixture. Refluxing is again continued at a temperature of about 145° C. for approximately 4 hours until an additional 1.8 grams (0.1 mol) of water is recovered, indicating the formation of the imidazolidine ring. At this time reflux is discontinued and the xylene azeotrope-forming solvent distilled from the reaction mixture. After the reaction mixture has cooled, the final product is dissolved in isopropyl alcohol and ethylene oxide gas slowly bubbled therethrough. A sharp rise in temperature will be noted but very little rise in pressure is noted, indicating the addition of the ethylene oxide to the imidazoline-imidazolidine compound. During addition of the ethylene oxide, the solution is maintained at a temperature of about 75–80° C. After approximately 0.2 mol of ethylene oxide is added to the imidazoline-imidazolidine compound, no further ethylene oxide is added. The reaction mixture is cooled and solubility of the anti-swelling composition tested in HCl and acetic acids.

The final oxyethylated imidazoline-imidazolidine compound of the above example is identified as compound D in Table I which follows. In a substantially similar manner any of the compounds identified in Table I which follows can be prepared by adhering to the conditions set forth in the foregoing example.

For example, the imidazoline-imidazolidine anti-swelling agent identified as compound M is prepared as follows: to about 14.6 grams (0.1 mol) of triethylene tetramine 28 grams (0.1 mol) of oleic acid is added with mixing. Fifty ml. of xylene is added to the reaction mixture and the mixture refluxed for a period of about 4 hours at a temperature of about 145° C. Refluxing is conducted in a decanter type still with a means provided to collect water of condensation separated as an azeotrope. After collection of approximately 0.1 mol of water indicating the formation of the imidazoline ring, 3 grams of formaldehyde is added to the reaction mixture and refluxing again initiated until an additional 0.1 mol of water recovered, indicating the formation of the imidazolidine ring. After the imidazolidine ring formation is assured, the xylene solvent is distilled from the reaction mixture. The reaction mixture is thereafter cooled, dissolved in approximately 50 ml. of isopropyl alcohol and treated with 8.8 grams of ethylene oxide. This quantity of ethylene oxide represents 0.2 mol which would correspond to 2 mols of ethylene oxide if equimolar quantities of the amine, acid, and aldehyde were used in preparing the product. After addition of ethylene oxide is completed, the alcohol solution is distilled and the anti-swelling agent identified as compound M in Table I recovered.

In Table I, data is provided showing the comparative effectiveness of various imidazoline-imidazolidine compounds in controlling the swelling of hydratable silicates. Table I is based on a series of tests carried out on 12-gram crushed samples of chalk containing approximately 0.7 gram of acid insoluble hydratable silicates. In conducting the test, like crushed samples were placed in graduated cylinders and treated with equal amounts of HCl. One acid solution used in treating had added thereto the indicated amount of the imidazoline-imidazolidine. This was compared with a control sample of chalk of like amount treated with acid containing no anti-swelling agent. The column headed percent reduction in clay volume is based on a visual comparison between the volumes if hydratable clays present in the two cylinders. The column identified as percent acid inhibition at 100 p.p.m. is based on a weight loss test similar to that described in U.S. 2,727,003.

TABLE I

| No. | Conc., Percent | Anti-Swelling Agent—Composition or Reaction | Mol Ratio | Nature of Soln. | Percent Redn. In Clay Volume | Percent Acid Inhibition at 100 p.p.m. Additive Conc. |
|---|---|---|---|---|---|---|
| Control | | 15% HCl only | | Clear | 0 | |
| Com. A | 0.5 | | | Dispersion | 35 | 65.8 |
| | 0.5 | | | do | 46 | 40.6 |
| | 0.5 | DETA [1] | | Clear | 8 | |
| | 0.5 | TETA [2] | | do | 24 | |
| | 0.5 | TETA Etoxide | 1:3 | do | 30 | |
| | 0.5 | TETA Formaldehyde Etoxide | 1:1:2 | do | 32 | |
| Com. B | 0.5 | TETA Oleic Formaldehyde Etoxide | 1:1:2 | Dispersion | 49 | 99.0 |
| | 0.5 | TEPA [3] | | Clear | 23 | |
| | 6.2 | HCHO | | do | 5 | |
| | 16.6 | Oleic | | Dispersion | (57 incr.) | |
| A | 0.5 | TEPA Oleic HCHO | 1:1:1 | do | 16 | 90.2 |
| B | 0.5 | TEPA Oleic HCHO Etoxide | 1:1:2 | Sl. Haze | 43 | 99.0 |
| C | 0.5 | TEPA Oleic Heptaldehyde | 1:1:1 | Disp | 24 | 91.6 |
| D | 0.5 | TEPA Oleic Heptaldehyde Etoxide | 1:1:2 | Sl. Haze | 51 | 99.3 |
| E | 0.5 | TEPA Oleic Benzaldehyde | 1:1:1 | Disp | 42 | 97.9 |
| F | 0.5 | TEPA Oleic Benzaldehyde Etoxide | 1:1:1 | Disp | 52 | 98.6 |
| G | 0.5 | TEPA Oleic Aldol | 1:1:1 | Disp | 41 | 95.5 |
| H | 0.5 | TEPA Oleic Aldol Etoxide | 1:1:1 | Sl. Haze | 51 | 97.7 |
| I | 0.5 | TEPA Benzoic Benzaldehyde | 1:1:1 | do | 24 | 92.7 |
| J | 0.5 | TEPA Benzoic Acetaldehyde | 1:1:1 | do | 42 | 80.4 |
| K | 0.5 | TEPA Benzoic Acetaldehyde Etoxide | 1:1:2 | Clear | | 90.2 |
| L | 0.5 | TETA Oleic HCHO | 1:1:1 | Disp | 49 | 95.9 |
| M | 0.5 | TETA Oleic HCHO Etoxide | 1:1:2 | Disp | 49 | 99.0 |
| N | 0.5 | TEPA Oleic Cyclohexanone | 1:1:1 | Sl. Disp | 51 | 98.0 |

[1] Diethylene triamine.
[2] Triethylene tetramine.
[3] Tetraethylene pentamine.

It will be evident from the table above, that the imidazoline-imidazolidine compounds in addition to minimizing clay swelling, possess important corrosition inhibiting properties which are most advantageous in minimizing the corrosive action of the acid solution.

The presence of the imidazoline-imidazolidine in the HCl acid solution is important in addition to controlling swelling of the silicate and providing protection against the corrosive action of the acid, in reducing the oil-water interfacial tension in the formation as previously indicated. This characteristic of the acid solutions of the present invention is most advantageous. Normally in conventional acidizing procedures, spent acid is often held in the formation by capillary forces. This action inhibits the flow of spent acid and oil to the well bore after treatment. If the oil-water interfacial tension is sufficiently low, the spent acid will flow back into the well more readily, thus permitting easier flow of oil to the well.

The aqueous acid solutions of the present invention are broadly defined as follows:

Weight percent
HCl ———————————————————————— 1–25
Imidazoline-imidazolidine (acid sol., mol. wt. 168–680) ———————————————— 0.01–2.0

When the organic acid is used, the aqueous acid solution includes the following:

Weight percent
HCl ———————————————————————— 1–25
Organic acid (1–5 carbon) ———————— 0.5–25
Imidazoline-imidazolidine (acid sol., mol. wt. 168–680) ———————————————— 0.01–2.0

Typical examples of effective acidizing solutions of the present invention are:

Example 1

| | Weight percent |
|---|---|
| Hydrochloric acid | 15 |
| TEPA, oleic, HCHO (1:1:1), Compound A, Table I | 0.5 |

Example 2

| | |
|---|---|
| Hydrochloric acid | 10.5 |
| Acetic acid | 8.5 |
| TEPA, oleic, HCHO (1:1:1), Compound A, Table I | 0.5 |

Example 3

| | |
|---|---|
| Hydrochloric acid | 12.0 |
| Butyric acid | 8.6 |
| TEPA, oleic, heptaldehyde, ethylene oxide (1:1:1:2), Compound D, Table I | 0.5 |

Example 4

| | |
|---|---|
| Hydrochloric acid | 10 |
| TEPA, oleic cyclohexanone (1:1:1), Compound N in Table I | 1.0 |

Example 5

| | |
|---|---|
| Hydrochloric acid | 7.5 |
| Propionic acid | 18.2 |
| TEPA, benzoic, benzaldehyde (1:1:1), Compound I, Table I | 0.3 |

Example 6

| | |
|---|---|
| Hydrochloric acid | 7 |
| TETA, oleic, HCHO, ethylene oxide (1:1:1:2), Compound M, Table I | 0.2 |

Example 7

| | |
|---|---|
| Hydrochloric acid | 10.5 |
| Propionic acid | 10.9 |
| TEPA, oleic, heptaldehyde, ethylene oxide (1:1:1:2), Compound D, Table I | 0.5 |

To test the effectiveness of the acid solutions of this invention acidizing tests were carried out on cores obtained from a formation containing approximately 5.84% hydratable silicates. The cores tested were obtained from a formation having the following characteristics:

CORE SUMMARY—R. FEE—WELL A

| | |
|---|---|
| Depth, feet | 1391.0–1521.0 |
| Percent core recovery | 100 |
| Feet of permeable, productive formation recovered | 69.0 |
| Average permeability, millidarcies | 0.2 |
| Average porosity, percent | 27.7 |
| Average residual oil saturation, percent pore space | 31.4 |
| Gravity of oil, °API | 42.0 |
| Average total water saturation, percent pore space | 41.8 |
| Average calculated connate water saturation, percent pore space | 31.0 |
| Solution gas-oil ratio,[1] cu. ft./bbl. | 100.0 |
| Formation volume factor [1] | 1.10 |

[1] Determined by reduction in pressure from estimated saturation pressure to atm. pressure.

The results of the test carried out on the cores obtained from the above formation are shown in Table II which follows: The tests were carried out on cores having a length of 2.25 cm. and a diameter of 1.9 cm. Core 139–2C was an exception in size and had a centimeter length of 2.576. Each test core prior to acidizing was air-dried for 2 to 3 weeks, saturated with water and then driven with kerosene to irreducible water saturation prior to acidizing. The acidizing was carried out on the individual cores with the acidizing composition identified. Each test core was first acidized with the solution indicated at 200 p.s.i. for ten minutes, 400 p.s.i. for ten minutes, 600 p.s.i. for ten minutes and thereafter at 1000 p.s.i until acid breakthrough.

The effectiveness of the particular composition identified can be determined by reference to the breakthrough time and to the acid rating value. This acid rating value is based on the following expression:

$$\text{Acid rating} = \frac{L}{(B.T.)(K_w)(V)}$$

wherein $L$ is the length of the core in centimeters; $B.T.$, the time in minutes required for breakthrough of acid; $K_w$, the water permeability in millidarcies; and $V$, the volume of the fluid produced through the core at the time of acid breakthrough. The higher the acid rating, the more effective the acidizing solution specified. It is, of course, to be understood that the composition of each core varies even if obtained from the same formation at the same depth. This, of course, makes an absolute comparison between acid solutions difficult; however, it will be quite evident that the acid solutions of the present invention having incorporated therein an imidazoline-imidazolidine are superior to HCl alone, or HCl and a selected organic acid, in increasing permeability by reason of the control of silicate swelling they provide during acidizing formations containing hydratable silicates.

TABLE II

| | Core Number | Weight Percent Anti-Swell Agent | Weight Percent Hydrochloric | Weight Percent Organic | Perm., Md.[1] | B.T.[2] Min. | Acid Rating |
|---|---|---|---|---|---|---|---|
| 1 | 113-7a | 0 | 15.0 | 0 | 0.0741 | 355.0 | 0.016 |
| 2 | 151-4b | 0 | 10.5 | 6.77 Formic | 0.164 | 38.53 | 0.267 |
| 3 | 131-11a | 0 | 10.5 | 8.83 Acetic | 0.0546 | 74.0 | 0.241 |
| 4 | 135-3b | 0 | 7.5 | 14.7 Acetic | 0.0464 | 62.6 | 0.431 |
| 5 | 110-1c | 0 | 10.5 | 10.9 Propionic | 0.0816 | 57.51 | 0.344 |
| 6 | 110-2a | 0 | 12.0 | 8.63 Butyric | 0.0942 | 68.42 | 0.234 |
| 7 | 113-7a2 | 0.5D | 15.0 | 0 | 0.0637 | 89.1 | 0.347 |
| 8 | 151-2a | 0.5D | 10.5 | 6.77 Formic | 0.0925 | 42.1 | 0.627 |
| 9 | 131-10 | 0.5D | 10.5 | 8.83 Acetic | 0.0528 | 40.5 | 1.05 |
| 10 | 139-2c | 0.5D | 10.5 | 6.77 Formic | 0.034 | 72.4 | 0.951 |
| 11 | 113-11b | 0.5M | 10.5 | 8.83 Acetic | 0.0496 | 42.3 | 0.892 |
| 12 | 131-9 | 0.5F | 10.5 | 8.83 Acetic | 0.0491 | 32.2 | 2.06 |
| 13 | 110-1a | 0.5D | 10.5 | 10.9 Propionic | 0.0935 | 40.52 | 0.591 |
| 14 | 110-3b | 0.5D | 12.0 | 8.63 Butyric | 0.0653 | 50.37 | 0.754 |

[1] Permeability before acidizing in millidarcies.
[2] Breakthrough time in minutes.

Referring now to Table II it will be noted that the aqueous HCl solutions containing the imidazoline-imidazolidine are far superior to HCl alone or to a mixture of HCl and acetic, formic acids, or other low molecular weight organic acids. For example, compare test 1 in which no imidazoline-imidazolidine was added with test 7 in which 0.5% of compound D was added to the HCl solution. The acid rating in test 1 is 0.016, whereas the acid rating in test 7 is 0.347, which is an increase in the acid rating of about 2000 percent. Compare also the results of test 2 in which no imidazoline-imidazolidine was used with test 8 in which 0.5 of anti-swelling agent D was added. The acid ratings are 0.267 and 0.627 respectively, demonstrating that the acid solution of test 8 is almost 3 times as effective. Similar or superior results will be noted in comparing test 3 with test 9, or 11 and test 5 with test 13.

In utilizing the acid compositions of the present invention, in treating formations containing hydratable silicates normal or conventional acidizing techniques will be used. The amount of acid solution will, of course, depend on the characteristics of the particular formation, the area to be treated and the increase in permeability desired.

In conventional acidizing techniques, the acid solution is introduced into the formation through the well tubing so as to come in contact with the formation to be treated. The acid solution may be introduced in single batch or in a series of slugs followed by a backing solution of oil or brine to insure contact of the acid with the formation. After a sufficient time has elapsed to spend the acid solution, the flush oil is pumped from the well and spent acid permitted to back flow into the well. After the spent acid has moved out of the formation it may be pumped from the well. If substantial increases in permeability are contemplated, it may be necessary to carry out repeated treatments of the formation. The acidizing compositions of the present solution can, of course, be used directly upon completion of a well, or on previously fractured or acidized wells, or they may be used in conjunction with secondary recovery processes, such as in water flooding.

While certain preferred embodiments of this invention have been described, it is to be understood that such description is not intended to limit the scope of this invention in any particular. The only limitations intended are those imposed by the claims appended hereto.

We claim:

1. A well treating composition comprising an aqueous solution containing from 1 to about 25% HCl, from 0.01 to 2% of an acid soluble imidazoline-imidazolidine having a molecular weight from 168 to 680 and from 0.5 to 25% of an aliphatic monocarboxylic acid having from 1 to 5 carbon atoms.

2. A well treating composition as claimed in claim 1 in which the aliphatic monocarboxylic acid is valeric acid.

3. A well treating composition as claimed in claim 1 wherein the aliphatic monocarboxylic acid is formic acid.

4. A well treating composition as claimed in claim 1 wherein the aliphatic monocarboxylic acid is acetic acid.

5. A well treating composition as claimed in claim 1 wherein the aliphatic monocarboxylic acid is propionic acid.

6. A well treating composition as claimed in claim 1 wherein the aliphatic monocarboxylic acid is butyric acid.

7. A well treating composition comprising an aqueous solution containing from 1 to 25% of HCl, about 0.5% of an acid soluble imidazoline-imidazolidine having a molecular weight from 168 to 680 and from 0.5 to 25% of an aliphatic monocarboxylic acid having from 1 to 5 carbon atoms.

8. A well treating composition comprising an aqueous solution containing from 1 to 25% HCl, from 0.01 to 2% of an acid soluble imidazoline-imidazolidine having a molecular weight from 168 to 680 oxyethylated with from 0.5 to about 5 mols of ethylene oxide and from 0.5 to 25% of an aliphatic monocarboxylic acid having from 1 to 5 carbon atoms.

9. A well treating composition as claimed in claim 8 wherein the imidazoline-imidazolidine is oxyethylated with 2 mols of ethylene oxide.

10. A well treating composition comprising an aqueous solution containing about 15% HCl, about 15% butyric acid, and from 0.01 to 2% of an acid soluble imidazoline-imidazolidine having a molecular weight of from 168 to 680.

11. A well treating composition as claimed in claim 10 where the imidazoline-imidazolidine is oxyethylated with from 0.5 to 5 mols of ethylene oxide.

12. A process for acidizing a calcareous oil bearing formation containing hydratable silicates which comprises introducing into the formation an aqueous hydrochloric acid solution containing from 1 to 25% of HCl, from 0.01 to about 2% of an acid soluble imidazoline-imidazolidine having a molecular weight of from 168 to 680 and from 0.5 to 25% of an aliphatic monocarboxylic acid having from 1 to 5 carbon atoms.

13. A process for acidizing a calcareous oil bearing formation containing hydratable silicates as claimed in claim 12 in which the aliphatic monocarboxylic acid is formic acid.

14. A process for acidizing a calcareous oil bearing formation containing hydratable silicates as claimed in claim 12 in which the aliphatic monocarboxylic acid is acetic acid.

15. A process for acidizing a calcareous oil bearing formation containing hydratable silicates as claimed in claim 12 in which the aliphatic monocarboxylic acid is propionic acid.

16. A process for acidizing a calcareous oil bearing formation containing hydratable silicates as claimed in claim 12 in which the aliphatic monocarboxylic acid is butyric acid.

17. A process for acidizing a calcareous oil bearing formation containing hydratable silicates as claimed in claim 12 in which the aliphatic monocarboxylic acid is valeric acid.

18. A process for acidizing a calcareous oil bearing formation containing hydratable silicates as claimed in claim 12 wherein the imidazoline-imidazolidine is oxyethylated with from 0.5 to 5 mols of ethylene oxide.

19. A process for acidizing a calcareous oil bearing formation containing hydratable silicates as claimed in claim 18 wherein the imidazoline-imidazolidine is oxyethylated with 2 mols of ethylene oxide.

References Cited in the file of this patent

UNITED STATES PATENTS

| | | |
|---|---|---|
| 2,292,208 | DeGroote et al. | Aug. 4, 1942 |
| 2,301,875 | Holmes | Nov. 10, 1942 |
| 2,400,395 | DeGroote et al. | May 14, 1946 |
| 2,468,163 | Blair et al. | Apr. 26, 1949 |
| 2,713,033 | Caldwell et al. | July 12, 1955 |
| 2,724,695 | Hughes | Nov. 22, 1955 |
| 2,761,836 | Brown et al. | Sept. 4, 1956 |